United States Patent [19]
Baker

[11] 3,860,940
[45] Jan. 14, 1975

[54] REFLEX CAMERA VIEWFINDER WITH IMAGE CORRECTING MEANS

[75] Inventor: James G. Baker, Winchester, Mass.

[73] Assignee: Polaroid Corporation, Cambridge, Mass.

[22] Filed: Dec. 19, 1973

[21] Appl. No.: 426,225

Related U.S. Application Data

[63] Continuation-in-part of Ser. No. 264,933, June 21, 1972, Pat. No. 3,783,764.

[52] U.S. Cl. ................. 354/155, 350/301, 354/225
[51] Int. Cl. ........................................... G03b 19/12
[58] Field of Search .......... 354/155, 152, 187, 219, 354/224, 225; 350/50, 52, 301

[56] References Cited
UNITED STATES PATENTS

| | | | |
|---|---|---|---|
| 2,350,793 | 6/1944 | Mihalyi | 354/155 |
| 2,980,001 | 4/1961 | Sauer et al. | 354/155 |
| 3,690,240 | 10/1970 | Gold | 354/155 |
| 3,783,760 | 1/1974 | Allen et al. | 354/155 |

*Primary Examiner*—Richard L. Moses
*Attorney, Agent, or Firm*—Frederick H. Brustman; John W. Ericson

[57] ABSTRACT

The present invention concerns an improvement to an off-axis viewer for a foldable reflex camera. It is a corrector plate with a non-rotational aspheric refracting surface configured to improve the sharpness of the image seen through the viewer. In doing so it allows a change in the non-rotational aspheric surface of the eye lens so as to eliminate most need for visual accommodation by the user. Mathematical descriptions of the aspheric surfaces are provided.

31 Claims, 6 Drawing Figures

CONTOURS OF EQUAL DIOPTERS

CONTOURS OF EQUAL HEIGHT

REFLEX CAMERA VIEWFINDER WITH IMAGE CORRECTING MEANS

CROSS REFERENCE TO RELATED APPLICATION

This application is a continuation-in-part of copending application Ser. No. 264,933 now U.S. Pat. No. 3,783,764 filed June 21, 1972.

BACKGROUND OF THE INVENTION

Constructing a compact folding reflex camera requires novel arrangements of its optical components. Achieving the optimum performance from a novel arrangement of components demands novel designs for the optical surfaces of the components used. U.S. patent application, Ser. No. 264,933 now U.S. Pat. No. 3,783,764 filed June 21, 1972 by James G. Baker and assigned to Polaroid Corporation, Cambridge, Mass., describes a novel arrangement of optical components in a viewing system particularly well suited for incorporation into a foldable reflex camera such as the SX–70 Land Camera sold by Polaroid Corporation. Another U.S. patent application, Ser. No. 197,851 now U.S. Pat. No. 3,810,221 filed Nov. 11, 1971 by William T. Plummer and also assigned to the Polaroid Corporation describes a novel design for the surfaces of a concave mirror and an eye lens to be used in the aforementioned viewing system.

The arrangement described in the former reference includes a focusing screen proximate the camera's film plane. The camera's viewfinder reimages that screen, and the image formed on it, for the benefit of a photographer using the camera. However, the viewfinder's optic axis defined by the path of light through it, is oblique to the focusing screen at their intersection. The oblique perspective results in the photographer seeing a tilted and trapezoidally shaped field unless it is corrected.

Reference should be had to the optical schematic of FIG. 2 for a better understanding of the following explanation of the viewer's function, and the purpose of certain features in it. It shows the arrangement of optical elements in the SX–70 Land Camera. The objective lens 16 forms an image (A'B'C') of a subject (A B C) on a Fresnel focusing screen 20. A concave mirror 48 in the viewer reimages the image (A'B'C') formed on the Fresnel focusing screen 20 to an aerial image (A''B''C''). An eye lens 50 magnifies the aerial image (A''B''C'') forming a large virtual image seen by the user at a comfortable distance.

The paths followed by the light reflected from the Fresnel focusing screen 20 to the concave mirror 48, via the reflex mirror 18, pass through the aperture stop 56 of the viewer 46. The aperture stop 56 limits the solid angle subtended by light rays reaching the concave mirror 48 from any point on the Fresnel focusing screen 20. It is reimaged by the concave mirror 48 and the eye lens 50 to form the exit pupil of the viewer 46.

A spherical concave mirror would strongly distort the scene observed through the viewer 46. The scene's upper corners would appear quite shrunken giving the overall scene a trapezoidal shape. This appearance occurs principally as a consequence of the off-axis orientation from which the concave mirror 48 sees the Fresnel focusing screen 20 through the aperture stop 56. Application Ser. No. 264,933 now U.S. Pat. No. 3,783,764 discloses that a rectilinear appearance can be restored to the scene by having less curvature at the upper part of the concave mirror 48. An image that has had its rectilinear appearance restored to it is referred to herein as a rectified image. Specifically, an optimum aspheric surface for the foregoing purposes can be developed from an ellipsoidal shape with one focus proximate the aperture stop 56. While the desired aspheric reflecting surface rectifies (restores) the rectilinear appearance of the scene, it has its own effects on the aerial image A''B''C''.

Using a spherical concave mirror far off-axis induces a great deal of astigmatism in the image it forms. The ellipsoidally derived aspheric surface 49 on the concave mirror 48 tends to overcorrect the astigmatism in the aerial image A''B''C'' and the aforementioned patent application, Ser. No. 264,933, teaches that the eye lens 56's surfaces can be tilted to help compensate for the overcorrection.

The lesser curvature of the upper part of the concave mirror 48 gives the upper part a longer focal length relative to the lower part, thus, the image point A'' is further to the right than the image point C'' even though the object distance from the concave mirror 48 to A' is greater than the object distance from the concave mirror 48 to C'. Left uncorrected, this creates a tilted field of view that requires considerable visual accommodation by the user to focus it properly.

To the user viewing those points through the eye lens 50, image point A'' appears closer than image point C''. If an eye lens 50 with spherical refracting surfaces has a power that forms the magnified virtual image of A''B''C'' so that point C'' appears to be at infinity, point A'' appears to be just 13 inches away. Comfortably viewing this virtual magnified image of A''B''C'' requires about 3 diopters of accommodation by the user's eye as it scans from the top to the bottom of the scene. However, with increasing age, the eyes less readily accommodate for necessary changes in focus; and it is preferable in any case that the user not have to accommodate with his eyes while scanning the scene in the viewer 46.

One possible solution is to make the eye lens 50 with two different curvatures on its rear surface, i.e., a bi-focal lens, the upper portion of which makes point A'' of the virtual image appear further away and the lower portion of which makes point C'' appear closer. The discontinuity of refractive power in a bi-focal eye lens results in a disconcerting jump in the virtual image as the eye scans up and down over the scene.

The aforementioned application Ser. No. 197,851 now U.S. Pat. No. 3,810,221 describes a novel approach to reducing the visual accommodation required for a user to comfortably use the viewer 46. It describes a novel aspheric shape for the flatter (rear) surface of the eye lens 50 (i.e., the rear or eyeward surface). The aspheric shape yields a surface 68 that is convex at its top and concave at its bottom. It helps to reduce the required visual accommodation by more than a third. However, the amount of asphericity permissible in the eye lens 50 and thus the lessening of the required visual accommodation, is limited by the influence of a coma like aberration related to the aspheric surface 49 of the concave mirror 48.

The aberration due to the concave mirror 48's aspheric surface 49 will be readily understood by considering its effect on the aerial image point B''. Recall that the concave mirror 48's aspheric surface 49 is descedant from an ellipsoid and is less curved (flatter) towards its top. Light rays leaving the aerial image point B″ spread out and, on reaching the eye lens 50 are refracted to fill the pupil of the user's eye located just in front of the viewer 48's exit pupil. Light rays travel in straight lines; and light rays entering the top of the pupil of the user's eye come from a lower region on the aspherically shaped surface 49 of the concave mirror 48 than light rays entering at its bottom. The image point B″ shifts leftward from its nominal position if formed only by light rays passing through the top of the viewer's exit pupil. This follows from the concave mirror 48 curving more strongly towards its bottom and less strongly towards its top. To a first approximation this aberration behaves like a combination of coma astigmatism and curvature of field, exacerbated by higher order aberrations as well. It will be referred to as CACF.

The user sees through the eye lens 50 a virtual image point whose apparent distance depends upon the vertical position of his eye within the viewer's exit pupil. It appears further when the eye is high and closer when the eye is low, but when the eye aligns with the exit pupil the virtual image point lacks sharpness and the eye searches for a compromise focus.

The aspheric shape of the eye lens 50's rear surface 68 compounds the influence of the mirror 48's aberration on the viewer 46's magnified image, because it has more power toward its top and less power towards its bottom. The light rays through a point in the aerial image (A″B″C″) that pass through the upper part of the exit pupil are effected by both a (lower) stronger part of the mirror 48 and by an (upper) stronger part of the eye lens 50 as compared with the regions of the mirror 48 and eye lens 50 used by light rays through the same point that pass through the lower part of the exit pupil.

Thus, an eye lens with a strong aspheric surface 68 to reduce the visual accommodation for the field tilt of A″B″C″ necessarily blurs the magnified virtual image because of excessive astigmatic refractive power gradient across the exit pupil.

Aforementioned application Ser. No. 197,851 now U.S. Pat No. 3,810,221 teaches an arrangement of specially configured optical surfaces on the mirror 48 and the eye lens 50 that promotes an advantageous compromise between minimizing the visual accommodation needed by the user and the blur seen by the user. A further improvement can be achieved by shortening the height of the aperture stop 56, located at the focus of the concave mirror 48, which reduces the height of the exit pupil, thereby improving the image quality of the viewer 46 by blocking aberration contributing light rays, as one skilled in the art will understand from the foregoing explanation. While shortening the aperture 56's height improves the image quality, it reduces the brightness of the image since less light reaches the user's eye.

Further improvement in the viewer 46 can be achieved by using an additional optical element. Aforementioned application Ser. No. 264,933 discloses that a refracting element, or corrector plate with aspheric surfaces, proximate the aperture stop 56, will have a positive effect on the image quality of the viewer 46 by reducing certain aberrations associated with the concave mirror 48 and the eye lens 50.

OBJECTS AND SUMMARY OF THE INVENTION

An object of the present invention is an improved viewer for a folding reflex camera.

Another object of the present invention is a viewer comprising a concave mirror, an eye lens, and a corrector plate each having a strong power gradient in a common direction.

Yet another object of the invention is to provide aspheric shapes for the optical surfaces of the viewer that will improve the sharpness of the viewer's magnified virtual image, reduce the visual accommodation needed to see the image, and allow enlarging the aperture stop to increase the image's brightness.

Other objects of the invention will in part appear hereinafter and will in part be obvious from the following description.

These and other objects of the invention are accomplished in a reflex camera by using an aspheric corrector plate proximate an aperture stop between the camera's viewer and its exposure chamber. The aspheric surface of the corrector plate has a strong power gradient from top to bottom.

The viewer has an oblique perspective of a Fresnel focusing screen located in the exposure chamber. It includes a concave mirror with an aspheric reflecting surface and an eye lens with an aspheric refracting surface. The aspheric surfaces function to reduce aberrations stemming from the oblique perspective.

The corrector plate's aspheric surface is positive toward its top edge and negative toward its bottom edge. Its power gradient (about 25 diopters in three-sixteenth inches) is strong enough so that light passing through the top and bottom of the exit pupil appears to come from a single point, even with an aspheric eye lens surface strong enough to reduce the visual accommodation problem (field tilt) to negligible proportions.

An important reason for the success of the corrector plate's aspheric surface is its location at the aperture stop 56. There light from all over the focusing screen will use substantially the same area of the aspheric surface allowing it to exert the same correction over the entire field of view. Thus, the aspheric corrector plate can counter balance (remove) the vertical power gradient across the exit pupil otherwise due to the concave mirror 48 and eye lens 50, and thereby reduce the effect of CACF, without nullifying the eye lens 56 asphere's minimization of the visual accommodation problem by correcting the field tilt of the aerial image A″B″C″.

The physical embodiment of the aspheric corrector plate is a small rectangular piece of methyl methacrylate with the aspherically shaped surface occupying a 3/16 inches diameter area at its center. Its rectangular form facilitates mounting an otherwise minute optical element.

For a fuller understanding of the nature and objects of the invention, reference should be had to the following detailed description taken in connection with the accompanying drawings, wherein:

THE PREFERRED EMBODIMENT

Figure 1:
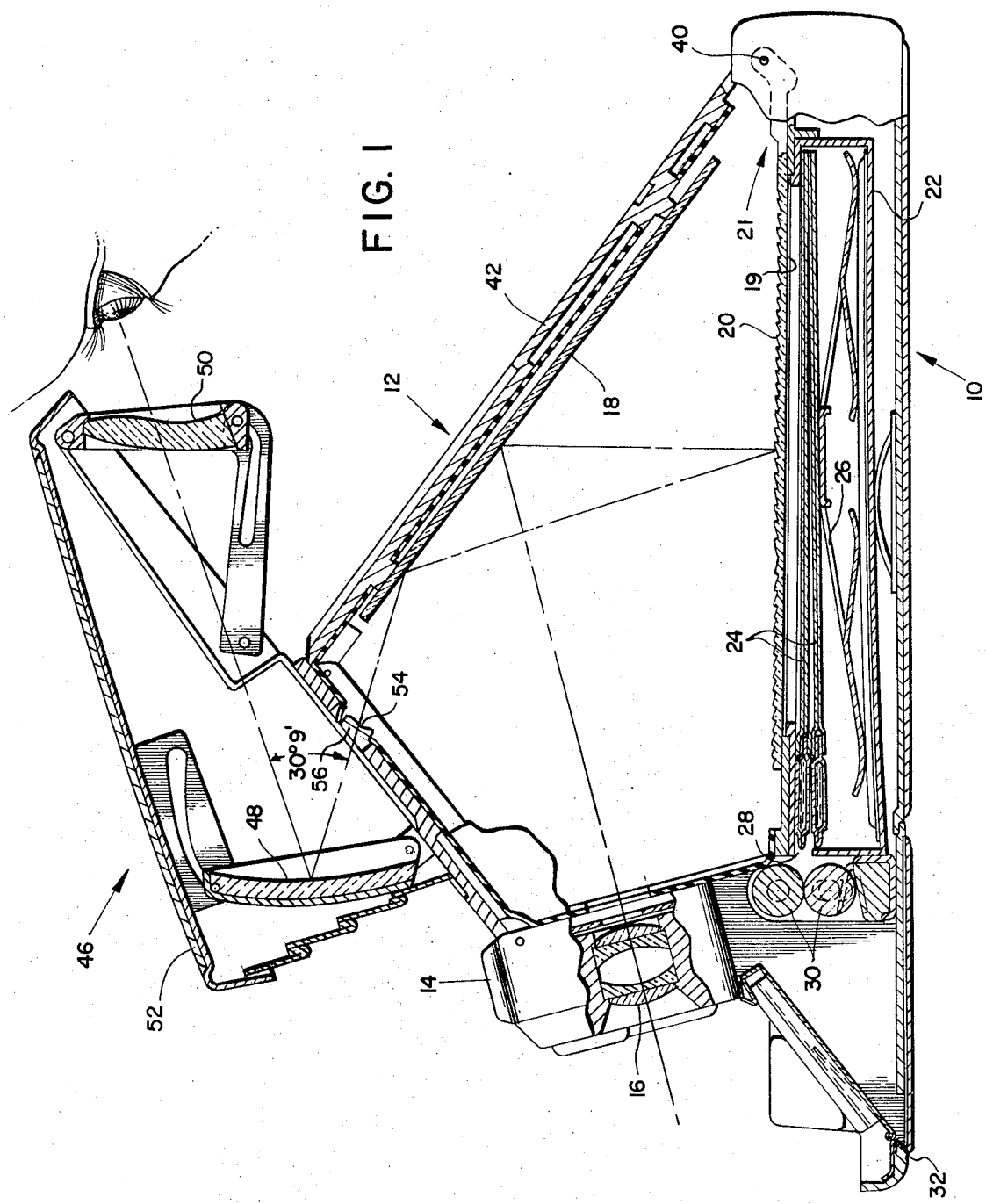
FIG. 1 illustrates a cross section taken through a foldable reflex camera embodying the invention.

The present invention is particularly useful in a foldable reflex camera 10 illustrated in FIG. 1. A hinged case 12, shown in its erected position, has a shutter housing 14 at its front. Inside the shutter housing is an objective lens 16 that forms a real image of a subject and projects the image rearwardly toward a plane viewing mirror 18 that reflects the image onto a focusing screen 20. The focusing screen 20 is attached to the upper side of a carrier 21 and lies parallel and close to the camera 10's film plane. A plane taking mirror 19 is attached to the underside of the carrier 21. In the position shown, the carrier 21 shields the film plane, situate below it, from inadvertent exposure to light. This is the viewing mode of the reflex camera 10.

Underneath the focusing screen 20 is a film cassette 22 containing several film units 24 and a means 26 for urging them upward. After each exposure a mechanism (not illustrated) slides the uppermost film unit 24 with its latent image through the slot 28 and into engagement with the processing rollers 30. The rollers 30 pass the film unit 24 between themselves bursting a pod of chemicals 34 incorporated into the film unit 24 and spreading them over its photosensitive surface to develop the latent image. After passing through the rollers 30 the film unit 24 emerges from the camera 10 through a slit 32 and completes the developing process outside the camera.

An exposure is made by pressing a switch (not shown) which initiates a series of operations within the reflex camera 10. One of those steps is the clockwise rotation of the carrier 21 about the pibot 40. It rotates until it stops against the cover 42 with the plane taking mirror 19 parallel to the plane viewing mirror 18 so as to reflect the objective lens 16's real image onto the uncovered photosensitive surface of the uppermost film unit 24 at the film plane. Careful construction of the reflex camera 10 insures that an image sharply focused on the focusing screen 20 will focus sharply on the film plane when the carrier 21 is at its most clockwise position.

A photographer aims the reflex camera 10 by looking into the viewer 46 at a magnified virtual image of the scene that the reflex camera 10 focuses on.

The viewer 46 includes a concave mirror 48 and a magnifying eye lens 50, both enclosed in a foldable housing 52, and a corrector plate (or corrector lens) 54. It receives light from the focusing screen 20 through an aperture stop 56 at which the corrector plate 54 is located. Light emanating from the real image formed on the focusing screen 20 is reflected by the plane viewing mirror 18 into the viewer 46.

Figure 2:
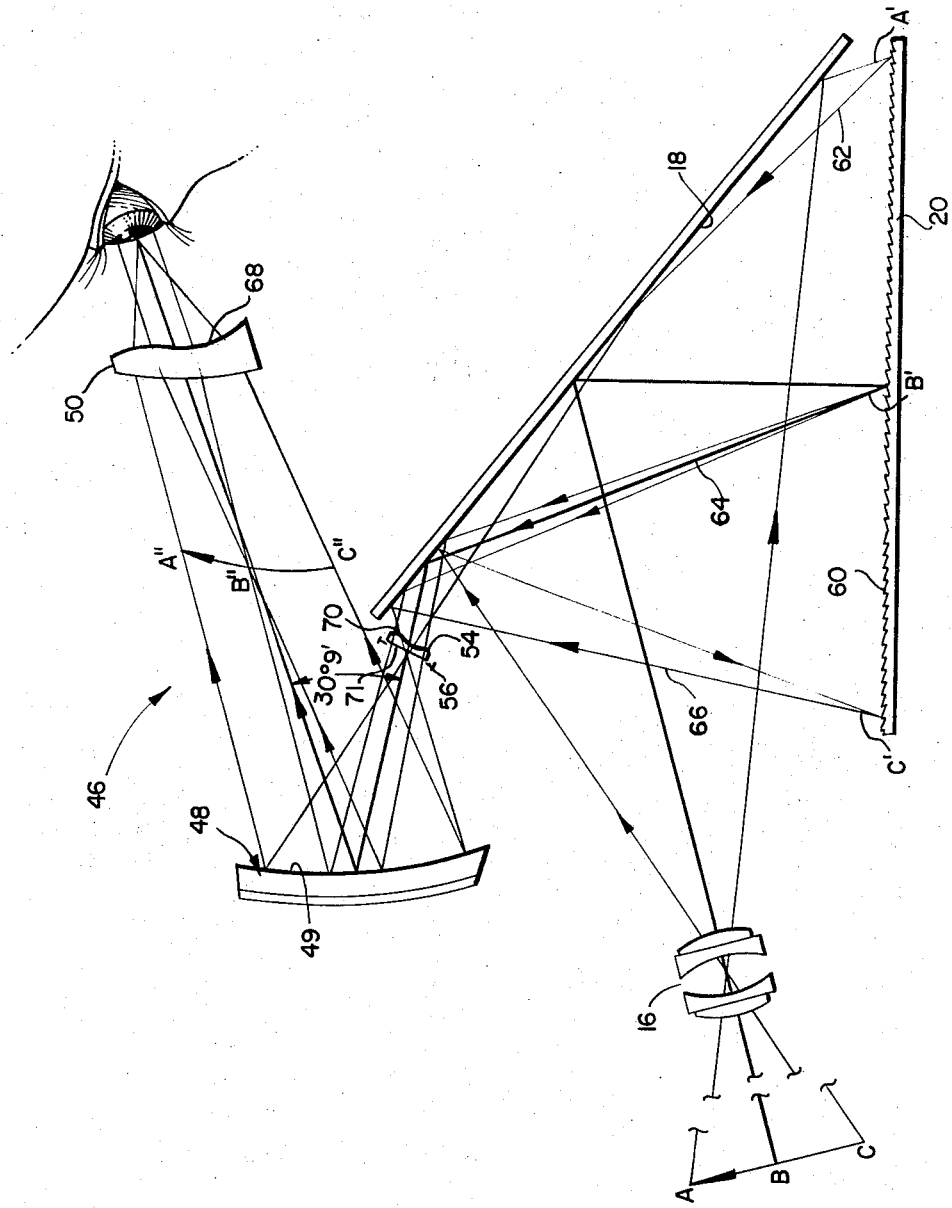
FIG. 2 illustrates, schematically, the optical system of the reflex camera of FIG. 1.

Reference to FIG. 2 and to the following paragraphs provides a clear understanding of the relation and interaction of the entire system's optics for viewing.

The objective lens 16 forms a real image A'B'C' of the arrow A B C and the plane viewing mirror 18 reflects onto the focusing screen 20. To enhance the brightness of the scene observed in the viewer 46 the focusing screen 20 is provided with a special echelon array 60. The reflective rulings in echelon array 60 are arranged to form an image of the objective lens 16's exit pupil at the aperture stop 56 insuring an optimum transfer of light into the viewer 46. It will be clear from the light ray paths that only an oblique reflection from the focusing screen 20 will bring the exit pupil image onto the aperture 56. Such an oblique reflection is achieved by locating the center of the echelon array 60 leftward of the focusing screen 20's geometric center. Further optimization of the transfer of light through the aperture 56 is achieved by configuring the rulings in the echelon array 60 to eliminate astigmatism in the exit pupil image otherwise associated with the oblique reflection from the focusing screen 20.

Inside the viewer 46 the concave mirror 48 receives the light passing through the aperture stop 56, and the corrector plate 54, and forms the real aerial image A"B"C". The image is magnified for the photographer user by the eye lens 50.

Three aspheric surfaces 49, 68 and 70 are used in the improved viewer 46. One of them is a reflecting surface (49) and two of them are refracting surfaces, one (68) on the eye lens 50 and the other (70) on the corrector plate 54. Each of them has a primary optical function in enhancing the appearance of the magnified virtual image.

Correcting differential magnification of the image A'B'C' stemming from its oblique orientation to the path of light into the viewer 46 is the function of the aspheric reflecting surface 49 on the concave mirror 48. If uncorrected the differential magnification would make the square format of the focusing screen 20 appear trapezoidal in the viewer 46.

A light ray 62, from point A' follows a course to the upper part of the mirror 48 longer than the course followed by the central light ray 64 from point B'. Light ray 66 from point C' to the lower part of mirror 48 follows the shortest course. The path followed by the central ray 64 coincides with the optic axis of the viewer 46 and delineates the viewing direction of the system and each component.

Shaping the mirror 48 with the proper aspheric contour so its power decreases toward the top will compensate for the differences so the image seen in the viewer 46 will be rectified, i.e., appear square rather than trapezoidal. However, this correction does not eliminate field tilt in the image A"B"C" which requires the user to accommodate the focus of his eye to the apparent location of the image as he scans from top to bottom.

On the eye lens 50 is the first aspheric refracting surface 68 that compensates the field tilt in the aerial image A"B"C" so as to eliminate any need for visual accommodation to see the magnified virtual image. Its region of maximum refractive power is located somewhat above center. The power of the aspheric surface 68 descreases in all directions from that maximum. In the direction toward its lower edge the power goes to 0 diopters below the center and reaches about −3 diopters at the lower edge of the aspheric surface 68.

At the aperture stop 56 the second aspheric refracting surface 70, formed on the corrector plate 54, acts on light rays passing through the top and bottom of the aperture stop 56. It accomplishes this through a strong power gradient from top to bottom. The power gradient is more than 16 diopters across the surface. It contours the second aspheric refracting surface 70 for convergent refraction above its center and divergent refraction below its center to compensate for the CACF due to the continuous power variation along the aspheric reflecting surface 49. It slightly over-corrects the CACF to allow for the subsequent action of the eye lens 50 on the light rays.

Figure 4:
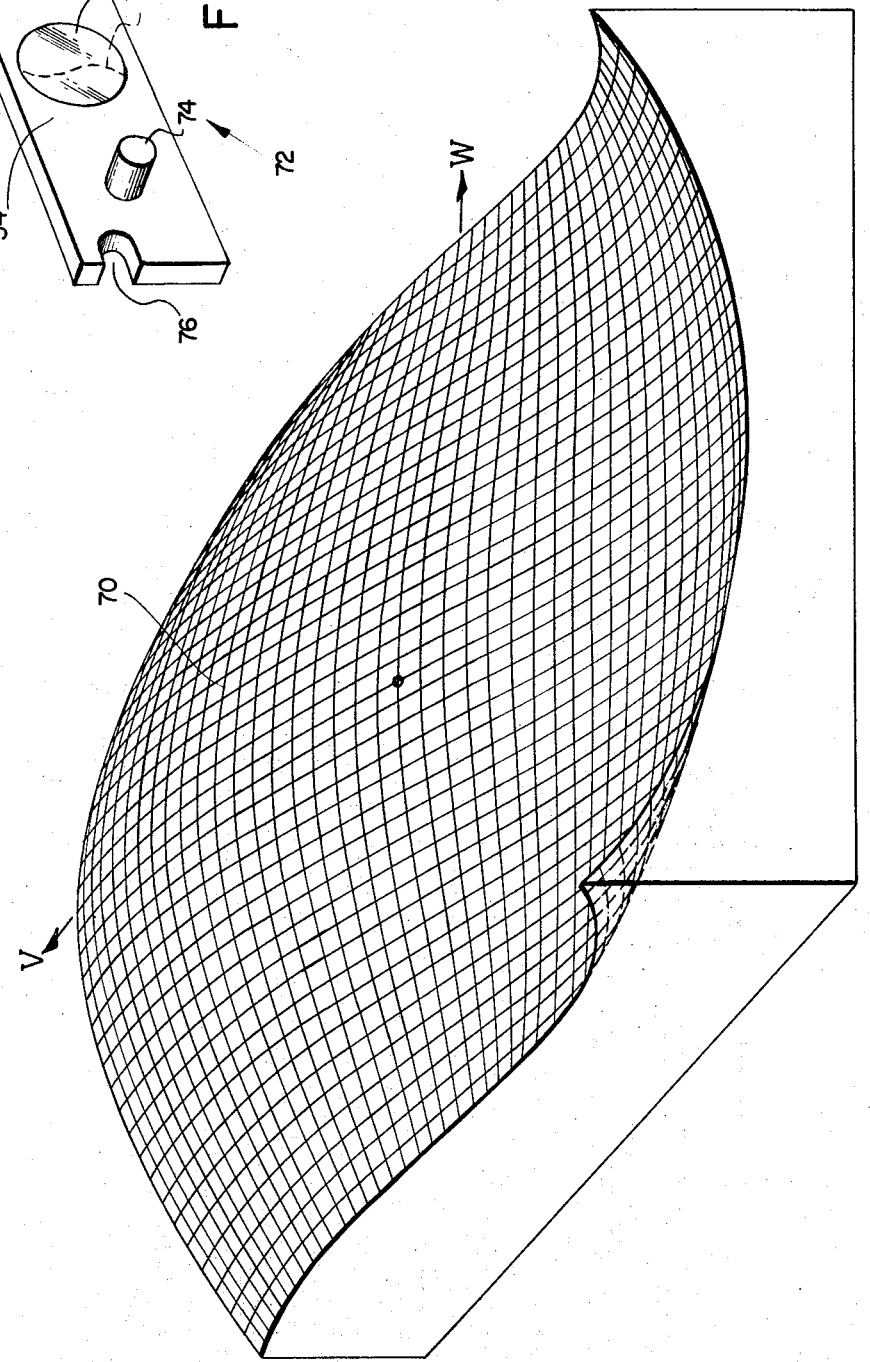
FIG. 4 is a perspective view of the aspheric refracting surface with vertical exaggeration.
Figure 5:
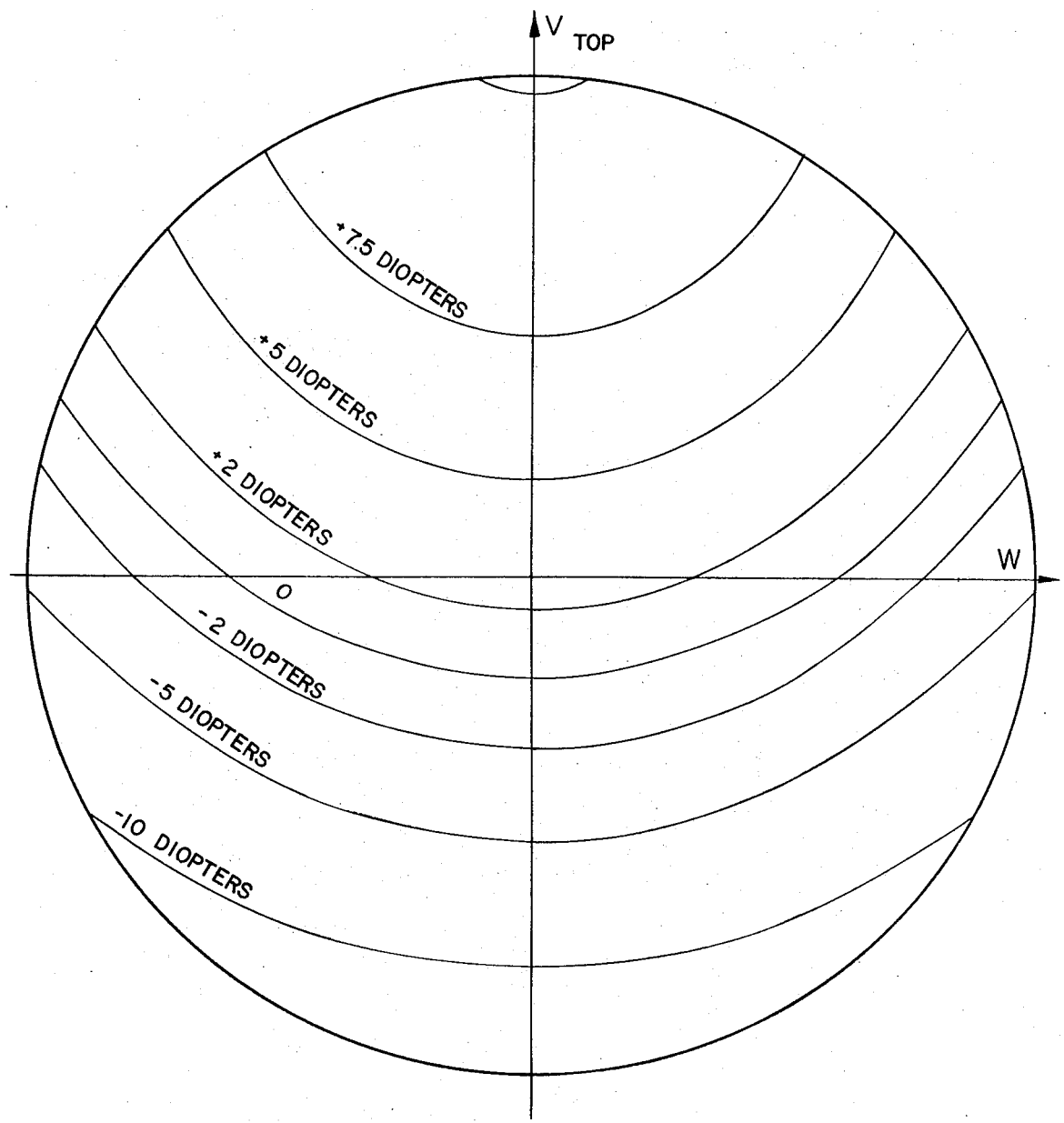
FIG. 5 is a plan view of the aspheric refracting surface with contours of equal dioptric power.
Figure 6:
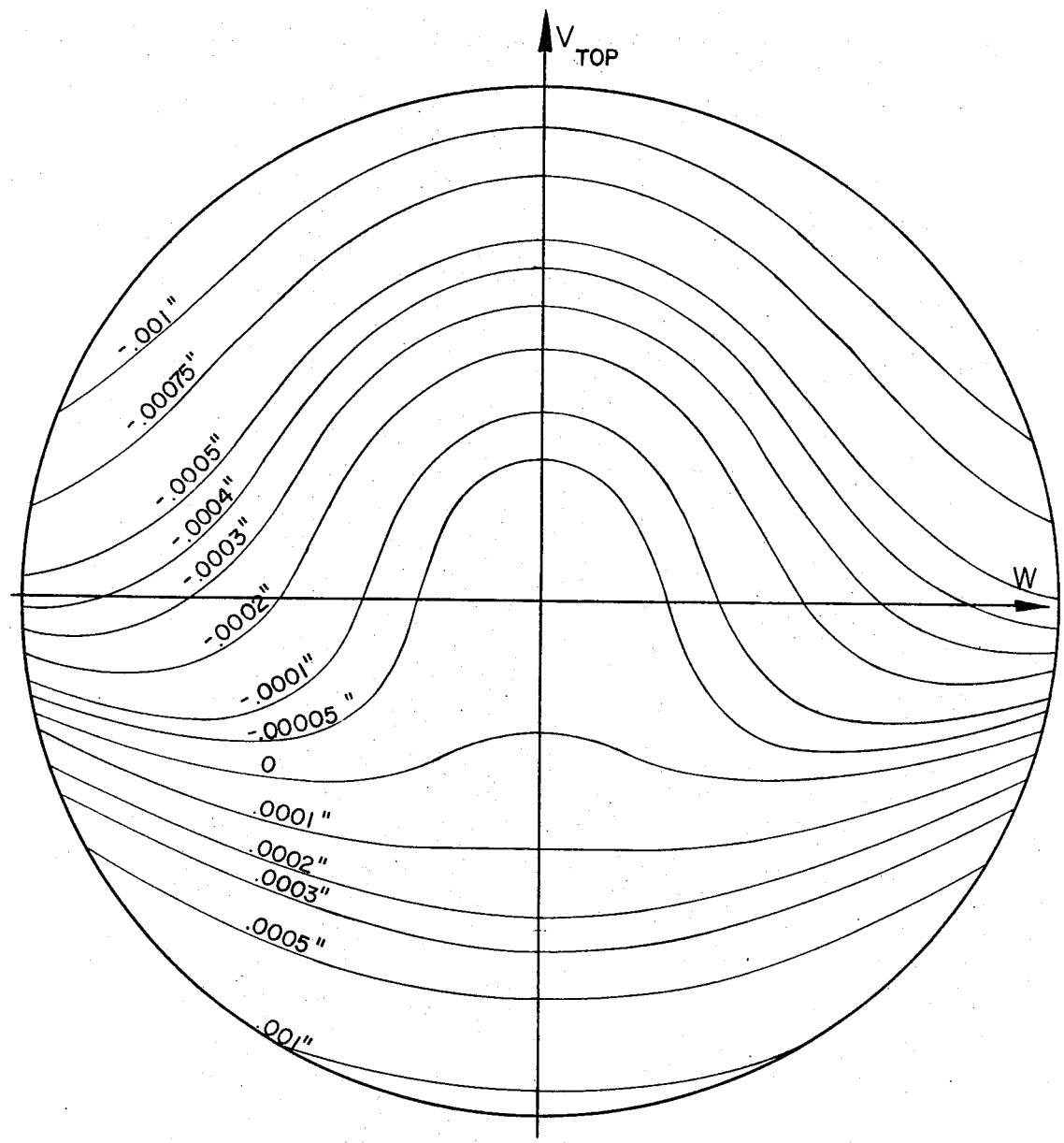
FIG. 6 is a plan view of the aspheric refracting surface with height contours.

FIG. 4 provides a conceptual idea of the second aspheric refracting surface 70's shape. Its vertical dimension is exaggerated by a factor of one thousand times its horizonal dimensions for clarity. The rectilinear plan of FIG. 4 encompases about the same area as the circular plan form of the second aspheric refracting surface 70 shown in FIGS. 5 and 6. They illustrate respectively, surface contours of equal dioptric power and equal height for one embodiment of the second aspheric refracting surface 70 whose mathematical expression is set out below.

Figure 3:
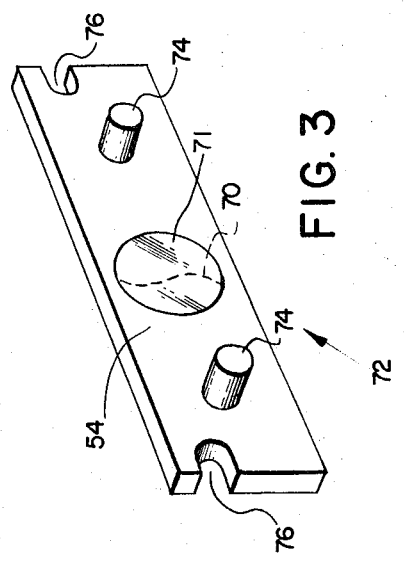
FIG. 3 illustrates an optical element with a special aspheric refracting surface according to the invention.

In practice the corrector plate 54 is molded as an integral portion of a transparent wafer 72 with a plano second surface 71 (see FIG. 3). Moling it as part of the wafer 72 allows for easy handling and mounting at assembly. The wafer 72 includes two tenons 74 and notches 76 at each end. They aid in locating it at its assembly into the camera 10. In addition, the tenons 74 are deformed after the wafer 72 is mounted in the camera 10 to retain it in position. Polymethyl methacrylate, polystyrene, and polycarbonate are suitable materials for molding the wafer 72. In the present example, polymethyl methacrylate is preferred.

A key to the success of the aspheric surface 70 in reducing CACF and thereby sharpening the image seen by the user is its location at the aperture stop 56. There the concave mirror 48 and eye lens 50 will, in effect, image it into the exit pupil of the viewer 46 which is the image of the aperture stop 56 formed by the concave mirror 48 and the eye lens 50. The exit pupil and the aperture stop 56 are optically conjugate to each other. Thus, the corrector plate 54 and the exit pupil are substantially conjugate to each other too. This is the optical equivalent of locating the corrector plate 54 at the user's eye.

If the corrector plate 54 is located with the aspheric surface 70 at the aperture stop 56, light from anywhere on the focusing screen 20 passes through the same area of it. Thus, the aspheric surface 70 can exert the same influence over all points in the scene. It can remove the power gradient over the exit pupil due to the eye lens 50's aspheric surface 68 without cancelling the latter's effective elimination of the visual accommodation formerly required of a user.

In practice, some advantage is gained by very slightly displacing the aspheric surface 70 of the corrector plate 54 from the aperture stop 56. Its displacement results in light from different points on the focusing screen 20 using slightly different, but substantially overlapping regions of the aspheric surface 70. Consequently, differential corrections for further improvement of the image can be obtained. The displacement for this is quite small, perhaps a millimeter. It can be effected by positioning the plano surface 71 against aperture stop 56 so the thickness of the wafer 72 separates the aspheric surface 70 from the aperture stop 56. Further improvement of image quality can be gained by tilting the corrector plate 54 about 15° with respect to the viewer's optic axis.

Three equations representing the general form of the aspheric surfaces are set out below together with sets of constants representing three specific aspheric surface shapes for use on optics of the reflex camera 10. All three surfaces are described to provide an understanding of how the eye lens and mirror surfaces relate to the corrector plate's surface and to each other.

THE EQUATION OF THE CONCAVE MIRROR $$Y = C_m X^2 / [1 + \sqrt{1 - (1 - e^2) C_m^2 X^2}] + A_2 X^2 + A_3 X^3 + A_4 X^4 + A_5 X^5 + A_6 X^6 + A_7 X^7 + A_8 X^8$$

In the preferred embodiment:
$C_m = 0.078\ 1250$ /in
$e^2 = 8,937.5728$
$A_2 = 0.269\ 7557$ /in
$A_3 = 0.019\ 2996$ /in$^2$
$A_4 = 0.010\ 0418$ /in$^3$
$A_5 = -0.009\ 0296$ /in$^4$
$A_6 = 0.001\ 7007$ /in$^5$
$A_7 = 0.000\ 0571$ /in$^6$
$A_8 = 0.000\ 1615$ /in$^7$ The aspheric shape of the concave mirror 48 is a portion of the surface of revolution swept out by rotating the curve of the foregoing equation about the Y axis. The center of that portion is 0.707 inches in the X direction from the Y axis; it coincides with the point of incidence on the mirror 48 of the central light ray 64 and it is 1.136 inches from the aperture stop 56. Mathematicians will recognize a hyperboloidal term in the foregoing equation. It is included to modify the apex of the surface of revolution and thereby simplify the optician's task.

THE EQUATION OF THE EYE LENS' ASPHERIC SURFACE $$U = -C_e(V^2 + W^2)/[1 + \sqrt{1 - C_e^2(V^2 + W^2)}] - \beta(V^2 + W^2)^2 - \gamma(V^2 + W^2)^3 - G_{20}V^2 - G_{30}V^3 - G_{40}V^4 - G_{12}VW^2 - G_{22}V^2W^2 - G_{04}W^4 - G_{50}V^5 - G_{60}V^6 - G_{32}V^3W^2 - G_{42}V^4W^2 - G_{14}VW^4 - G_{24}V^2W^4 - G_{06}W^6$$

In the preferred embodiment:

| | | | | |
|---|---|---|---|---|
| $C_e$ | $= +$ | 0.084 5842 /in | $G_{04} = +$ | 0.017 4634 /in$^3$ |
| $\gamma$ | $= -$ | 0.031 1774 /in$^3$ | $G_{50} = -$ | 0.250 8936 /in$^4$ |
| $\gamma$ | $= -$ | 0.039 9483 /in$^5$ | $G_{60} = -$ | 0.153 2495 /in$^5$ |
| $G_{20}$ | $= +$ | 0.031 9021 /in | $G_{32} = -$ | 0.331 8010 /in$^4$ |
| $G_{30}$ | $= +$ | 0.029 8990 /in$^2$ | $G_{42} = -$ | 0.297 4251 /in$^5$ |
| $G_{40}$ | $= -$ | 0.161 1068 /in$^3$ | $G_{14} = -$ | 0.159 5828 /in$^4$ |
| $G_{12}$ | $= +$ | 0.096 7585 /in$^2$ | $G_{24} = -$ | 0.016 2401 /in$^5$ |
| $G_{22}$ | $= -$ | 0.152 9133 /in$^3$ | $G_{06} = -$ | 0.142 6479 /in$^5$ |

The shape of the eye lens 50's aspheric surface 68 is described by the foregoing equation wherein the coordinate center ($V = W = 0$) is 0.107 inches above the viewer's optic axis. On the forward surface of the eye lens 50 is a convex positively refracting shape. It has a spherical surface of radius of 0.905 inches separated from the center of the concave mirror 48 by 2.806 inches and it is centered below the viewer's optic axis. The center thickness of the eye lens 50 is about 0.194 inches.

THE EQUATION OF THE CORRECTOR PLATE'S ASPHERIC SURFACE $$U = -P_{20}V^2 - P_{02}W^2 - P_{30}V^3 - P_{12}VW^2 - P_{40}V^4 - P_{22}V^2W^2 - P_{04}W^4$$

In the preferred embodiment:
$P_{20} = +0.034\ 1201$
$P_{02} = +0.101\ 4619$
$P_{30} = +1.454\ 9541$
$P_{12} = +2.302\ 5668$
$P_{40} = -3.304\ 5988$ $P_{22} = -8.098\ 0936$
$P_{04} = -5.940\ 9107$ The shape of the corrector plate 54's aspheric refracting surface 70 is described by the foregoing equation wherein $U$ is oriented at 15° with respect to the viewer's optic axis. The other refracting surface of the corrector plate 54 is plano and orthogonal to the $U$ direction. The corrector plate 54 is about 0.032 inches thick.

Those skilled in the art will recognize that fewer significant digits in the foregoing constants will adequately describe these complex surfaces for constructional purposes.

Each of the aspheric surfaces described above contributes to the quality of the magnified virtual image seen in the viewer 46, primarily by performing the specific functions explained above. In doing so they each eliminate compromises otherwise required in the function of the other optical elements in the viewer 46. Moreover, these aspheric shapes are such powerful tools for reducing optical aberrations that they can aid in performing optical correcting functions other than their primary ones.

Clearly, a digital computer will facilitate the selection of new constants for a specific application of these concepts to another optical system and on evaluation of the expected optical performance.

It can be readily understood that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that, within the scope of the appended claims, the instant invention may be practiced in a manner otherwise than specifically described herein.

What is claimed is:

1. A viewer comprising:
    means for forming a rectified real image of a focusing screen having an oblique orientation to the optical path through said viewer, wherein the arrangement and the shape of said means for forming said rectified real image causes CACF in, and imparts field tilt to, said rectified real image;
    means, including a first aspheric optical surface, for minimizing said field tilt by providing different optical powers for viewing different parts of said rectified real image; and
    means, including a second aspheric optical surface, for reducing said CACF by providing a compensating optical power gradient at a location substantially conjugate to the exit pupil of said viewer.

2. The viewer described in claim 1 further comprising means for defining an aperture stop optically conjugate to said exit pupil, and wherein said second aspheric optical surface is slightly displaced from said means for defining an aperture stop so light from different points on said focusing screen will use slightly different, but substantially overlapping regions of said second aspheric optical surface so as to impart differential corrections for reducing said CACF.

3. The viewer described in claim 2 wherein said second aspheric optical surface is tilted with respect to said optical path.

4. The viewer described in claim 1 wherein said second aspheric control surface has a non-rotational shape.

5. The viewer described in claim 4 wherein said means for forming a rectified real image includes an element having a varying power gradient thereon and the power of said second aspheric optical surface differs between adjacent areas such that light rays, emanating from a point on said focusing screen, incident on an optically weaker part of said element, relative to another part of said element, will have utilized an optically stronger part of said second aspheric optical surface, relative to another part of said second aspheric optical surface.

6. The viewer described in claim 5 wherein the general shape of said second aspheric optical surface is described by the equation
$$U = -P_{20}V^2 - P_{02}W^2 - P_{30}V^3 - P_{12}VW^2 - P_{40}V^4 - P_{22}V^2W^2 - P_{04}W^4$$
wherein $U, V, W$ represent a coordinate system and the directions designated by $V$ and $W$ are transverse to said optical path, and the subscripted $P$ terms are preselected constants determined by the specific optical effects desired of said second aspheric optical surface.

7. The viewer described in claim 2 wherein said means for reducing said CACF comprises a corrector plate, said second aspheric surface constitutes at least a portion of one surface of said corrector plate and the surface of said corrector plate opposite said second aspheric surface is a plane surface and said plane surface is positioned against said means for defining an aperture stop, said displacement being determined by the thickness of said corrector plate.

8. The viewer described in claim 1 further comprising:
    an aperture stop optically conjugate to said exit pupil; and
    a support means; wherein said means for correcting said CACF comprises a corrector plate, said second aspheric surface constitutes at least part of one surface of said corrector plate and said corrector plate includes mounting means formed integrally with said corrector plate, said mounting means including at least one tenon for attaching said mounting means to said support means and at least one notch for orienting said corrector plate with respect to said support means.

9. The viewer described in claim 8 wherein said support means includes means for defining said aperture stop.

10. A viewer comprising:
    means for forming a rectified real image of a focusing screen having an oblique orientation to the optic axis of said viewer, wherein the shape of said image forming means causes CACF in, and imparts field tilt to said rectified real image;
    means for magnifying said rectified real image to form a virtual image thereof, said magnifying means including an optical surface with a first spheric shape for minimizing said field unit tilt otherwise perceived in said virtual image by providing different optical powers for viewing different parts of said rectified real image; and
    means, including an optical surface with a second aspheric shape, for reducing said CACF by providing a compensating power gradient, said CACF reducing means being located substantially conjugate, optically, to an exit pupil of said viewer.

11. The viewer described in claim 10 wherein said means for forming a rectified real image comprises an aspheric concave mirror, said means for magnifying comprises an eye lens and said means for reducing said CACF comprises a corrector plate.

12. The viewer described in claim 10 wherein said optical surface with said first aspheric shape is continuously contoured and constitutes the side of an eye lens situate away from said image forming means.

13. The viewer described in claim 10 further comprising an aperture stop optically conjugate to said exit pupil, wherein said optical surface with said second aspheric shape is continuously contoured and is separated a small distance from said aperture stop so light from different points on said focusing screen will use slightly different, but substantially overlapping portions of said optical surface with said second aspheric shape.

14. The viewer described in claim 10 wherein the dioptric power of said optical surface with said first aspheric shape, on said magnifying means, differs between adjacent areas in relation to the optical distance from said optical surface with said first aspheric shape of portions of said rectified real image associated with said adjacent areas.

15. The viewer described in claim 10 wherein said means for forming said rectified real image includes an aspheric concave mirror having a power gradient thereon and the power of said optical surface with said second aspheric shape differs between adjacent areas such that light rays, emanating from a point on said focusing screen, incident on an optically weaker part of said aspheric concave mirror, relative to another part of said aspheric concave mirror, will have passed through an optically stronger part of said second aspheric shape, relative to another part of said second aspheric shape.

16. The viewer described in claim 10 wherein said optical surface with said second aspheric shape, has a continuous contour, described by a polynomial expression of at least the third order, so its dioptric power varies continuously as a function of height.

17. The viewer described in claim 11 wherein:
the general shape of said aspheric concave mirror is a portion, away from the rotational axis, of the surface of revolution generated by rotating, about the Y axis, the curve described for positive values of $X$ by the equation
$$Y = C_m X^2 / [1 + \sqrt{1 - (1-e^2) C_m^2 X^2}] + A_2 X^2 + A_3 X^3 + A_4 X^4 + A_5 X^5 + A_6 X^6 + A_7 X^7 + A_8 X^8;$$
the general shape of said first aspheric shape on said eye lens is described by the equation
$$U = -C_e(V^2+W^2)/[1+\sqrt{1-C_e^2(V^2+W^2)}] - \beta(V^2+W^2)^2 - \gamma(V^2+W^2)^3 - G_{20}V^2 - G_{30}V^3 - G_{40}V^4 - G_{12}VW^2 - G_{22}V^2W^2 - G_{04}W^4 - G_{50}V^5 - G_{60}V^6 - G_{32}V^3W^2 - G_{42}V^4W^2 - G_{14}VW^4 - G_{24}V^2W^4 - G_{06}W^6;$$
and
the general shape of said second aspheric shape on said corrector plate is described by the equation
$$U = -P_{20}V^2 - P_{02}W^2 - P_{30}V^3 - P_{12}VW^2 - P_{40}V^4 - P_{22}V^2W^2 - P_{04}W^4$$
wherein $U$, $V$, $W$, represent a coordinate system and the directions designated by $V$ and $W$ are transverse to the optic axis of said viewer, the constants $C_m$ and $C_e$ represent nominal curvatures associated with said aspheric concave mirror and said first aspheric surface on said eye lens respectively, the values of the constants $e^2$ and the subscripted $A$ terms are preselected constants determined by the optical effects desired of said aspheric concave mirror, the values of the constants $\beta$, $\gamma$, and the subscripted $G$ terms are preselected constants determined by the optical effects desired of said first aspheric shape on said eye lens, and the subscripted $P$ terms are preselected constants determined by the optical effects desired of said second aspheric shape on said corrector plate.

18. The viewer described in claim 16 further comprising: a spherical surface on the side of said eye lens toward said aspheric concave mirror; and a plane surface on the side of said corrector plate toward said aspheric concave mirror; wherein said spherical surface has a radius of 0.905 inch, centered below the viewer's optical axis, and wherein the constants have the values tabulated herein:

for said aspheric concave mirror
$C_m = 0.078\ 13$ /in
$e^2 = 8.94 \times 10^3$
$A_2 = 0.269\ 76$ /in
$A_3 = 0.019\ 30$ /in$^2$
$A_4 = 0.010\ 04$ /in$^3$
$A_5 = 0.009\ 03$ /in$^4$
$A_6 = 0.001\ 70$ /in$^5$
$A_7 = 0.000\ 06$ /in$^6$
$A_8 = 0.000\ 16$ /in$^7$
and the center of the utilized portion of said surface of revolution is 0.707 inches in the X direction from the Y axis;

for said first aspheric shape on said eye lens

| | |
|---|---|
| $C_e = +0.08458$ /in | $G_{04} = +0.01746$ /in$^3$ |
| $\beta = -0.03118$ /in$^3$ | $G_{50} = -0.25089$ /in$^4$ |
| $\gamma = -0.03995$ /in$^5$ | $G_{60} = -0.15325$ /in$^5$ |
| $G_{20} = +0.03190$ /in | $G_{32} = -0.33180$ /in$^4$ |
| $G_{30} = +0.02990$ /in$^2$ | $G_{42} = -0.29743$ /in$^5$ |
| $G_{40} = -0.16111$ /in$^3$ | $G_{14} = -0.15958$ /in$^4$ |
| $G_{12} = +0.09676$ /in$^2$ | $G_{24} = -0.01624$ /in$^5$ |
| $G_{22} = -0.15291$ /in$^3$ | $G_{06} = -0.14265$ /in$^5$ | with its coordinate center ($V = W = 0$) shifted 0.107 inches above the viewer's optic axis; and for said second aspheric shape on said corrector plate
$P_{20} = +0.0341$
$P_{02} = +0.1015$
$P_{30} = +1.455$
$P_{12} = +2.303$
$P_{40} = -3.30$
$P_{22} = -8.1$
$P_{04} = -5.9$
wherein the coordinate axis U of said second aspheric shape on said corrector plate is oriented at 15° to the viewer's optic axis.

19. A viewfinder comprising:
aspheric reflecting means, having a viewing direction, for forming a rectified real image of a focusing screen oriented at an oblique angle with respect to said viewing direction, wherein the arrangement and the shape of said aspheric reflecting means causes CACF in, and imparts field tilt to, said rectified real image;
eye lens means for magnifying said rectified real image to form a virtual image, said eye lens including accommodation reducing means for minimizing said field tilt of said virtual image corrector means located optically conjugate to the exit pupil of said viewfinder, for reducing said CACF otherwise apparent in said virtual image.

20. The viewfinder described in claim 19 wherein; said accommodation reducing means comprises a first aspheric refracting surface, on said eye lens means, whose dioptric power differs between adjacent areas in relation to the optical distance from said refracting surface of portions of said rectified real image associated with said adjacent areas.

21. The viewfinder described in claim 19 wherein: said corrector means for reducing said CACF comprises a correcting plate with a second aspheric refracting surface whose power differs between adjacent areas such that light rays, emanating from a point on said focusing screen, incident on an optically weaker part of said aspheric reflecting means, relative to another part of said aspheric reflecting means, will have passed through an optically stronger part of said second aspheric refracting surface, relative to another part of said second aspheric refracting surface.

22. The viewfinder described in claim 21 further comprising an aperture stop optically conjugate to said exit pupil and wherein said corrector means is positioned, with respect to said aperture stop, so said second aspheric refracting surface is lightly displaced therefrom.

23. The viewfinder described in claim 21, wherein said second aspheric refracting surface, situate on said correcting plate, has a continuous contour, described by a polynomial expression of at least the third order, so its dioptric power varies continuously as a function of height.

24. A camera comprising:
an objective lens;
an eye lens; and
means defining an optical path between said objective lens and said eye lens, said optical path defining means including a reflective focusing screen positioned at a focal plane of said objective lens, a first mirror disposed to first reflect a primary real image formed by said objective lens onto said reflective focusing screen and to subsequently reflect light emanating from said primary image on said reflective focusing screen, said light emanating obliquely from said reflective focusing screen, an aspheric concave mirror for forming a rectified real image of said reflective focusing screen using said light wherein the shape and the arrangement of said aspheric concave mirror introduces field tilt into said rectified real image and said shape of said aspheric concave mirror causes CACF in said rectified real image, an aperture stop disposed between said first mirror and said aspheric concave mirror to transmit said light, a correcting plate disposed proximate said aperture stop, said eye lens arranged to form a magnified virtual image of said rectified real image, a first aspheric refracting surface, situate on said eye lens, for minimizing said field tilt otherwise associated with said magnified virtual image, and a second aspheric refracting surface, situate on said correcting plate, for reducing said CACF otherwise associated with said magnified virtual image.

25. The camera described in claim 24 wherein the dioptric power of said second aspheric refracting surface, situate on said correcting plate, differs between adjacent areas such that light rays, emanating from a point on said reflective focusing screen, incident on a less optically strong part of said aspheric concave mirror, relative to another part of said aspheric concave mirror, will have passed through an optically stronger part of said second aspheric refracting surface, relative to another part of said second aspheric refracting surface.

26. The camera described in claim 24 wherein said second aspheric surface is spaced a small distance from said aperture stop.

27. The camera described in claim 26 wherein said first aspheric refracting surface is the side of said eye lens situate away from said aspheric concave mirror and said correcting plate is on the side of said aperture stop situate away from said aspheric concave mirror and said second aspheric refracting surface is on the side of said correcting plate furthest from said aspheric concave mirror.

28. The camera described in claim 24 wherein said second aspheric refracting surface, situate on said correcting plate, has a continuous contour, described by a polynomial expression of at least the third order, so its dioptric power varies continuously as a function of height.

29. The camera described in claim 24 wherein:
the general shape of said aspheric concave mirror is a portion, away from the rotational axis, of the surface of revolution generated by rotating, about the $Y$ axis, the curve described for positive values of $X$ by the equation
$Y = C_m X^2 / [1 + \sqrt{1 - (1 - e^2) C_m^2 X^2}] + A_2 X^2 + A_3 X^3 + A_4 X^4 + A_5 X^5 + A_6 X^6 + A_7 X^7 + A_8 X^8;$
the general shape of said first aspheric surface, on said eye lens, is described by the equation
$U = - C_e (V^2 + W^2)/[1 + \sqrt{1 - C_e^2 (V^2 + W^2)}] - \beta (V^2 + W^2)^2 - \gamma (V^2 + W^2)^3 - G_{20} V^2 - G_{30} V^3 - G_{40} V^4 - G_{12} V W^2 - G_{22} V^2 W^2 - G_{04} W^4 - G_{50} V^5 - G_{60} V^6 - G_{32} V^3 W^2 - G_{42} V^4 W^2 - G_{14} V W^4 - G_{24} V^2 W^4 - G_{06} W^6;$
and
the general shape of said second aspheric surface, on said corrector plate, is described by the equation
$U = - P_{20} V^2 - P_{02} W^2 - P_{30} V^3 - P_{12} V W^2 - P_{40} V^4 - P_{22} V^2 W^2 - P_{04} W^4$
wherein $U$, $V$, $W$, represent a coordinate system and the directions designated by $V$ and $W$ are transverse to the optic axis of said viewer, the constants $C_m$ and $C_e$ represent nominal curvatures associated with said aspheric concave mirror and said first aspheric surface respectively, the values of the constants $e^2$ and the subscripted $A$ terms are preselected constants determined by the optical effects desired of said aspheric concave mirror, the values of the constants $\beta$, $\gamma$, and the subscripted G terms are preselected constants determined by the optical effects desired of said first aspheric surface, and the subscripted $P$ terms are preselected constants determined by the optical effects desired of said second aspheric surface.

30. The camera described in claim 29 further comprising: a spherical surface on the side of said eye lens toward said aspheric concave mirror; and a plane surface on the side of said corrector plate toward said aspheric concave mirror; wherein said aperture stop separates said corrector plate from said aspheric concave mirror, wherein said spherical surface has a radius of 0.905 inches, centered below the system's optical axis, and wherein said preselected constants have the values tabulated herein:

for said aspheric concave mirror
$C_m = 0.078\ 13$ /in
$e^2 = 8.94 \times 10^3$
$A_2 = 0.269\ 76$ /in
$A_3 = 0.019\ 30$ /in$^2$
$A_4 = 0.010\ 04$ /in$^3$
$A_5 = 0.009\ 03$ /in$^4$
$A_6 = 0.001\ 70$ /in$^5$
$A_7 = 0.000\ 06$ /in$^6$
$A_8 = 0.000\ 16$ /in$^7$ and the center of the utilized portion of said surface of revolution is 0.707 inches in the X direction from the Y axis;

for said first aspheric surface $C_e = +0.08458$ /in
$\beta = -0.03118$ /in$^3$
$\gamma = -0.03995$ /in$^5$
$G_{20} = +0.03190$ /in
$G_{30} = +0.02990$ /in$^2$
$G_{40} = -0.16111$ /in$^3$
$G_{12} = +0.09676$ /in$^2$
$G_{22} = -0.15291$ /in$^3$
$G_{04} = +0.01746$ /in$^3$
$G_{50} = -0.25089$ /in$^4$
$G_{60} = -0.15325$ /in$^5$
$G_{32} = -0.33180$ /in$^4$
$G_{42} = -0.29743$ /in$^5$
$G_{14} = -0.15958$ /in$^4$
$G_{24} = -0.01624$ /in$^5$
$G_{06} = -0.14265$ /in$^5$ with its coordinate center ($V = W = 0$) shifted 0.107 inches above the optic axis through the eye lens; and for said second aspheric surface
$P_{20} = +0.0341$
$P_{02} = +0.1015$
$P_{30} = +1.455$
$P_{12} = +2.303$
$P_{40} = -3.30$
$P_{22} = -8.1$
$P_{04} = -5.9$ wherein the coordinate axis U of said second aspheric surface is oriented at 15° to the viewer's axis.

31. An optical element having an aspheric surface described by the equation
$U = -P_{20}V^2 - P_{02}W^2 - P_{30}V^3 - P_{12}VW^2 - P_{40}V^4 - P_{22}V^2W^2 - P_{04}W^4$ wherein $U$, $V$ and $W$ represent a coordinate system and the directions designated by $V$ and $W$ are transverse to the optical path through said optical element and the subscripted $P$ terms are constants having the values tabulated herein:

$P_{20} = +0.0341$
$P_{02} = +0.1015$
$P_{30} = +1.455$
$P_{12} = +2.303$
$P_{40} = -3.30$
$P_{22} = -8.1$
$P_{04} = -5.9$ for the $U$ direction oriented at 15° to said optical path.

* * * * *